July 1, 1947.  T. O. SUMMERS, JR  2,423,269
GYROSCOPIC ATTITUDE INDICATING INSTRUMENT
Filed Sept. 9, 1942  3 Sheets-Sheet 1

THOMAS O. SUMMERS JR.,
INVENTOR.

BY Stuart N. Mauee
ATTORNEY.

July 1, 1947.    T. O. SUMMERS, JR    2,423,269
GYROSCOPIC ATTITUDE INDICATING INSTRUMENT
Filed Sept. 9, 1942    3 Sheets-Sheet 2

THOMAS O. SUMMERS JR.,
INVENTOR.

BY
ATTORNEY.

July 1, 1947.  T. O. SUMMERS, JR  2,423,269
GYROSCOPIC ATTITUDE INDICATING INSTRUMENT
Filed Sept. 9, 1942  3 Sheets-Sheet 3

THOMAS O. SUMMERS JR.,
INVENTOR.

BY
ATTORNEY.

Patented July 1, 1947

2,423,269

UNITED STATES PATENT OFFICE 2,423,269

GYROSCOPIC ATTITUDE INDICATING INSTRUMENT

Thomas O. Summers, Jr., Los Angeles, Calif.

Application September 9, 1942, Serial No. 457,730

5 Claims. (Cl. 33—204)

This invention relates to flight instruments, and more particularly to a flight indicator adapted to portray spacial orientation of an aircraft.

An object of my invention is to provide a navigating instrument of improved and simplified design, for indicating the attitude of an aircraft with respect to its fore and aft and its transverse axes.

In navigating an airplane, if the horizon line is visible, it is logical for the pilot to base the manipulation of his ship upon the apparent movements of the horizon, which result from deviations of the ship from level flight. For example, if the horizon line, which, of course, is always stationary, appears to be moving downwards, the only possible cause is that the nose of the ship is rising, whereas if the horizon line appears to be tilting to one side, it is caused by tilting, or rolling, of the ship in the opposite direction. Therefore, in learning to fly a ship by observation of the real horizon line, a pilot must first learn that a certain action which appears to be very real and positive, actually is not occurring at all, but instead, something else is occurring which makes that action apparent in spite of its nonexistence. Consequently, flight-indicating instruments of conventional design, wherein a reference line is caused to move in accordance with unreal, but very apparent movements of the horizon line, must be interpreted to mean, not what they show, but instead, a certain action which is the only possible cause of the apparent movement of the real horizon which is simulated by the movement of the instrument's indicator.

It is a further object of the present invention, therefore, to provide an attitude-indicating instrument, the reading of which is not dependent upon any false representation based upon facts which are apparent, but actually unreal, and which can be explained only by other facts which are real.

Another object is the provision of a novel type of suspension for gyroscopic instruments whereby it is freely supported for movement about a given axis without the necessity of a journal to support an end of the instrument through which that axis passes, and where the indicating dial and indicating media are located, thus making for less restriction in the observation of the instrument and accordingly, less liability of confusion of its reading.

A further object in this connection, is the provision of a novel gyroscope suspension of the character indicated which is peculiarly adapted for use in connection with air-driven gyroscopes inasmuch as it lends itself most advantageously to the incorporation therewith of means for conducting fluid under pressure past the journal support and to the mechanism carried thereby, thus greatly facilitating the ordinarily somewhat difficult problem of conducting motivating fluid to the gyroscope.

The invention prossesses other objects and valuable features, some of which, with those enumerated, will be set forth in the following description of the preferred embodiment illustrated in the drawings accompanying and forming part of the specification. It is to be understood that I do not limit myself to the showing made by the said drawings and description as I may adopt variations of the preferred embodiment within the scope of my invention, as defined in the claims.

Referring to the drawings.

Figure 1:
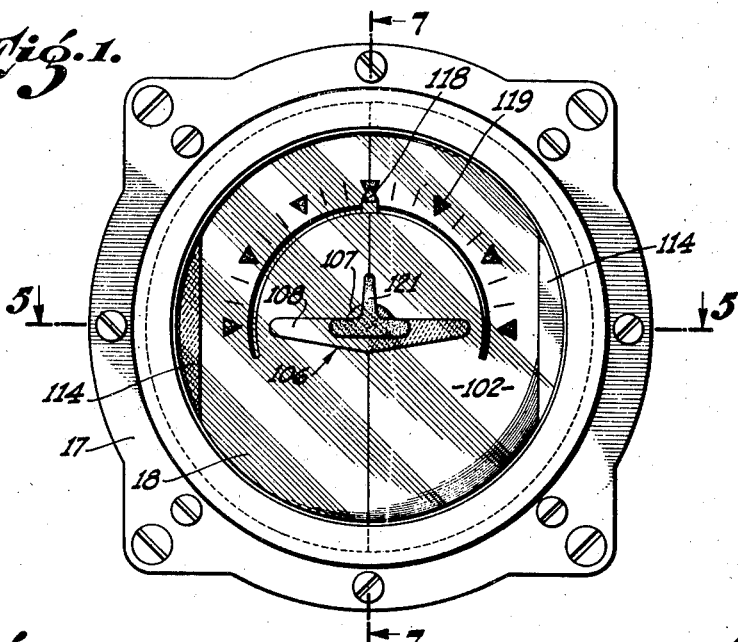
Figure 1 is a face view of an instrument incorporating the principles of the present invention and showing the indicating media thereof in their respective positions to indicate level attitude.

In accordance with the present invention, my improved attitude-indicating instrument is enclosed within a suitable housing 16, having an end wall 17, which preferably is provided with a transparent window 18 through which the indicating media are visible, the instrument being designed for mounting on the instrument panel such as that of an airplane with the wall 17 thereof and its window 18 facing aft so that the indicating media are in position for the facile observation thereof by the pilot. Upon the opposite wall 19 a preferably cylindrical extension 21 is provided for the accommodation of a bearing support, indicated in its entirety at 22, and the details of the construction of which constitute one of the important features of the present invention.

This bearing support 22 comprises a bracket 23 rigid with the housing extension 21 and having a pair of spaced parallel legs 24 and 26, respectively, extending laterally therefrom. These legs carry co-axially aligned pins 27 and 28, respectively, which are substantially pointed and so mounted upon the legs 24 and 26 that the pointed ends thereof are directed oppositely. Each of the pins is movable with respect to the bracket 23, for which purpose it preferably is threaded through a hole in one of the legs thereof, thus permitting its accurate adjustment to its desired position, after which it is releasably, but firmly clamped, as by a locknut 29. The aligned pins 27 and 28 serve as the pivotal support for another and similar bracket 31 having two spaced, parallel legs 32 and 33, the spacing between which is greater than the distance between the distal faces of the legs 24 and 26 to permit the bracket 31 to be disposed with its legs 32 and 33 in embracing relationship with the legs 24 and 26 of the bracket 23. Each of the legs 32 and 33 carries a suitable anti-friction bearing 34 which engages one of the pins 27, 28, in such manner as to support the bracket 31 for free rotary motion about the axis of the pins. The importance of the fact that the pins 27 and 28 are substantially pointed is that it enables the anti-friction bearings 34 to engage them at portions of very small diameter, and thereby minimize the amount of friction which develops when the bracket 31 turns upon the bracket 23.

The bracket 31 is preferably formed integrally with a gimbal ring 41. In fact, for economy of space, the leg 33 of the bracket 31 preferably is an actual part of the gimbal ring 41, i. e. the anti-friction bearing 34 of the leg 33 is actually imbedded within the outer peripheral surface of the gimbal ring 41.

For the purpose of economizing in weight, it is preferred that the gimbal ring 41, instead of being actually annular as its name would imply, is of U-shaped construction. The gimbal 41 is provided adjacent the outer ends of its legs with opposed, axially aligned anti-friction bearings 42 which serve as the pivotal support for the rotor bearing casing 43 of the instrument's gyroscope, which is indicated in its entirety at 44. Moreover, the common axis of the anti-friction bearings 42 is perpendicular to that of the bearings 34. In accordance with the customary practice in the construction of gimbal mountings for gyroscopes, preferably the pins 46, which are carried by the rotor housing 44 and which are revolubly engaged in the anti-friction bearings 42, are also substantially pointed for the same purpose as that described hereinabove in connection with the pins 27 and 28.

The rotor 51 of the gyroscope is journaled within the rotor bearing casing 43, as through the expedient of a spindle 52, the substantially pointed ends 53 of which are revolubly engaged by upper and lower anti-friction bearings 54 and 56, respectively. Also, in accordance with conventional gyroscope construction, the axis of the spindle 52 is perpendicular to, and passes through the intersection of, the major and minor axes of the gimbal mounting, i. e., through the axis of the pins 27 and 28, and through that of the transverse pins 46, respectively.

Inasmuch as the instrument here being described is designed for air operation, I provide a series of buckets 61 in the outer periphery of the rotor 51 of the gyroscope, and also provide means for a directing fluid under pressure, such as compressed air, thereagainst in a substantially tangential direction. For this purpose, a plurality of tangential orifices 62 in the inner wall of the rotor bearing casing 44 communicate with a manifold passage 63, which in turn communicates with the hollow interior 64 of one or both of the pins 46, whereby communication is established with a passageway 66 in the gimbal 41 leading to a position between the legs 32 and 33 of its bracket 31. A similar passage 67 is provided in the stationary bracket 22, and in order to establish continuous, but flexible intercommunication between the passages 66 and 67, I provide, preferably between the legs 24 and 26 of the stationary bracket, an additional pair of co-operating brackets 71 and 72 rigidly mounted upon the stationary bracket 23 and the rotary bracket 31, respectively. Each of the brackets 71 and 72 has a passageway therein communicating with the passageway 67 and the passageway 66, respectively; and one of the brackets, say the bracket 72, carries a tubular extension 73 disposed in co-axial alignment with the pins 27 and 28 and fitted within an opening 74 in one side of the other bracket, say the bracket 71, so that its bore communicates at all times with the passageway thereof. Consequently, these co-operating brackets 71 and 72 with their interfitting tube 73 and opening 74 constitute a flexible joint whereby fluid under pressure can continuously flow from the passageway 67 to the passageway 66 on its way to the rotor 51, without interfering in any manner with the relatively free movement of the bracket 31 and the structure supported thereby with respect to the stationary bracket 23. In order to prevent leakage in this flexible joint, a suitable packing means 76 is employed. For example, a preferred form of packing, and one which is ideally suited to the requirements of the present installation is the magnetic fluid seal forming the subject matter of my co-pending application Serial No. 450,826, filed July 13, 1942.

It is apparent, therefore, that the gimbal 41 and the structure supported thereby, are mounted within the housing 16 for free rotary movement about an axis extending longitudinally thereof without the necessity of providing a supporting journal for this freely supported mechanism at that end thereof which is proximal to the window 18, thereby leaving that end fully exposed for unrestricted observation. Importance attaches to this detail, inasmuch as it is at this end where the indicating media, of which unhampered observation is desirable, are located.

I prefer to provide a pair of opposed resilient cushions 81 and 82 in position where they are engaged by the rotary bracket 31 when it approaches its extremes of rotary movement, and thereby limit the extent of rotary movement of the gimbal 41 about the major axis. Similarly, I provide means for limiting rotary movement of the rotor housing 43 about the minor axis, such as a pair of suitably located cushions 83 and 84 (see Figure 9) protruding from the sides of the rotor housing 43 far enough to engage the top and bottom edges, respectively, of the gimbal 41.

An erecting mechanism 91 is associated with the gyro in accordance with conventional practice, its function being to maintain the gyro in that position wherein the axis of spin of its rotor 51 is accurately vertical. Whereas the details of construction of the erecting mechanism have no bearing on the present invention, there is no need, as far as the present disclosure is concerned, for describing it in detail. Suffice it therefore to state that the erector 91 corresponds to that forming the subject matter of my co-pending application, Serial No. 463,050 filed October 23, 1942, but it is to be understood that it has been illustrated in an exemplary, and not a limiting sense. However, since this erecting mechanism depends for its operation upon the flow of fluid therethrough, it serves, through the expedient of its outlet orifices 92, as the means of escape of the air from the rotor housing 43 after it has completed its function of imparting spin to the rotor.

Figure 5:
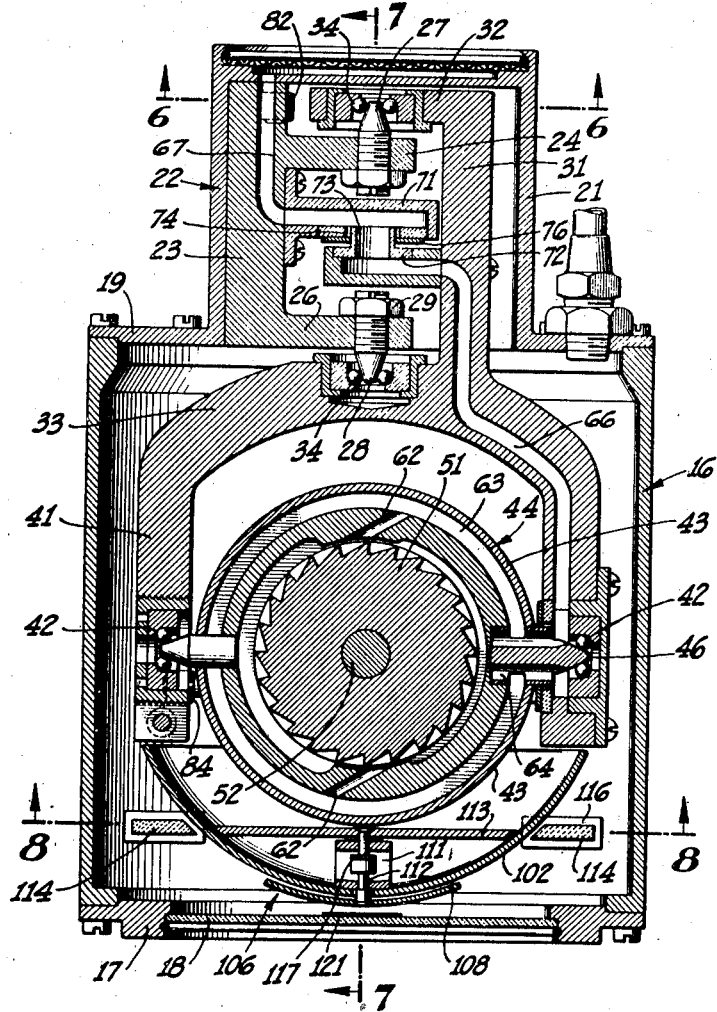
Figure 5 is a horizontal, medial, sectional view of the instrument, the plane of section being indicated by the line 5—5 of Figure 1, and the direction of view by the arrows.
Figure 6:
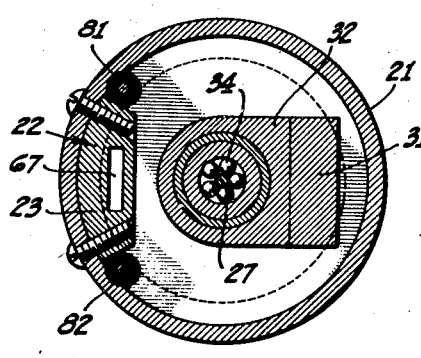
Figure 6 is a transverse, vertical, sectional view taken upon the line 6—6 of Figure 5 with the direction of view as indicated.
Figure 7:
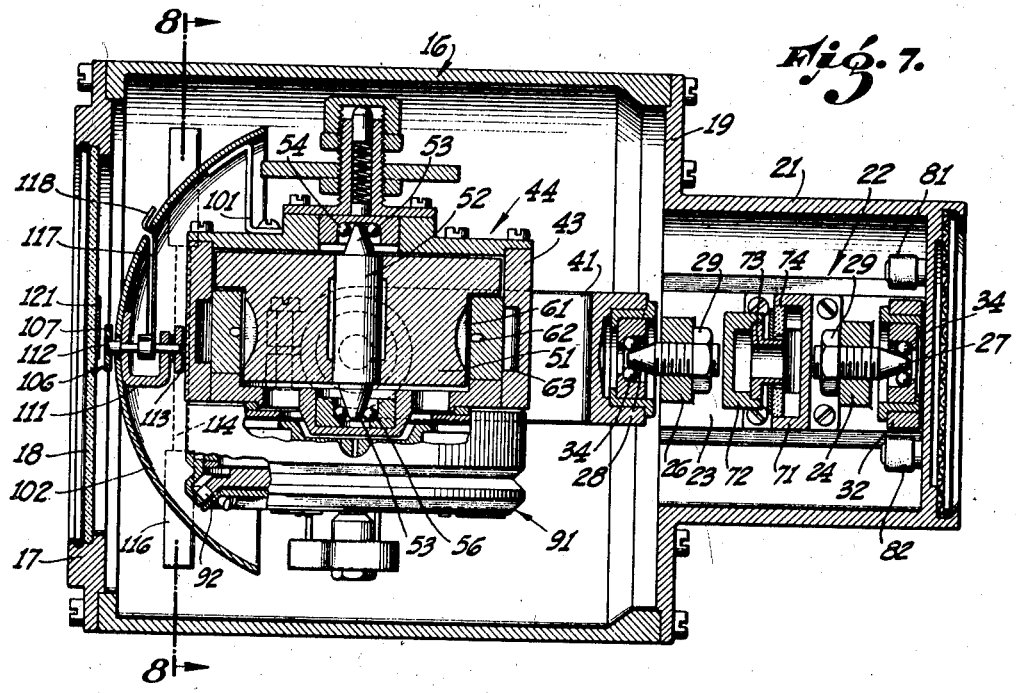
Figure 7 is a vertical, medial, sectional view, the plane of section being indicated by the lines 7—7 of Figures 1 and 5, and the direction of view by the arrows.
Figures 8, 9:
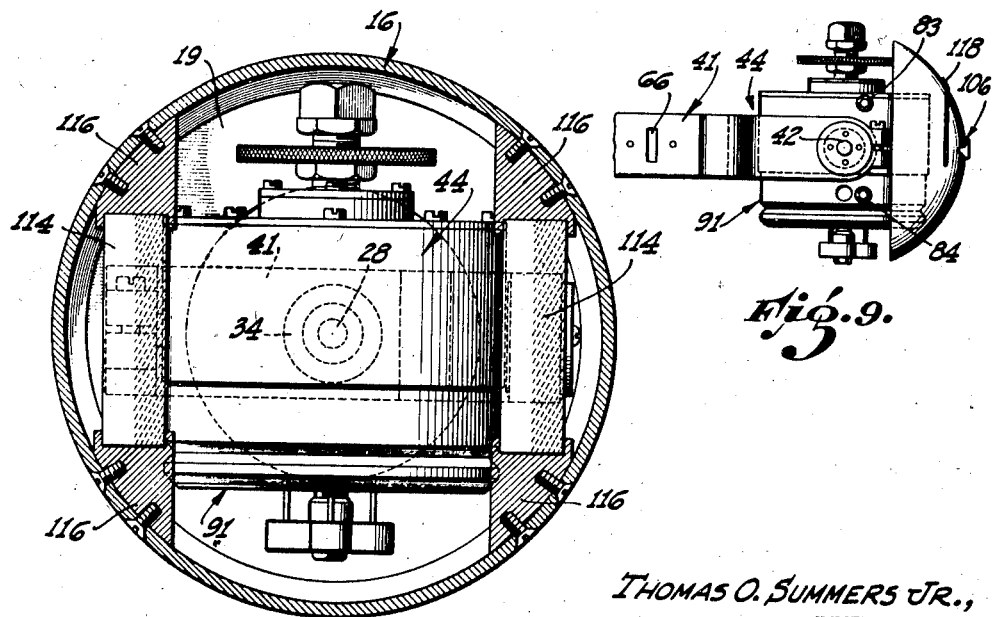
Figure 8 is a transverse, vertical, sectional view taken upon the lines 8—8 of Figures 5 and 7, with the direction of view as indicated.
Figure 9 is a view in side elevation, drawn to reduced scale, of the gyro rotor housing and the parts immediately associated therewith. Portions of the figure are broken away to reduce its size.

Mounted upon the rotor housing 43, as by means of a plurality of supporting brackets 101, is a dial plate 102, the form of which is preferably that of a segment of a sphere. This dial plate 102 is disposed just inside the window 18 where it serves as a suitable background for the indicating media, and conceals the operating mechanism of the instrument. Its spherical configuration and the location of its center at or closely adjacent the intersection of the gimbal axes permit unimpaired rotary movement of the casing 16 about both the major and minor axes of the gyro without liability of interference between the dial plate and any portion of the casing. Carried by the dial plate, is an indicator 106, the preferable form of which is, as shown in Figures 1 to 4 inclusive, the profile of the forward part of an airplane when viewed from the rear. That is to say, this indicator 106 includes a central portion 107, the top of which is rounded in simulation of the shape of a cabin of an ordinary airplane, and a lateral extension 108 on each side thereof and tapering outwards in simulation of the profile of the forward wing portion of an airplane. This indicator 106 is mounted for free rotary movement with respect to the gyro and about the major axis thereof, i. e., about the axes of the aligned pins 27 and 28. For this purpose a U-shaped bracket 111 is affixed to the after surface of the dial plate 102, and is provided with aligned holes in its opposed legs for the revoluble support of a rod 112, to the forward end of which the indicator 106 is affixed. To the after end of the rod 112, a transversely extending strip 113 of suitable magnetic material is affixed so that it and the indicator 107 are rigidly maintained parallel to each other. This strip 113 serves as an armature for two opposed bar magnets 114 which are rigidly mounted upon the casing 16 as by supporting brackets 116. As shown in Figures 5 and 8, these magnets are extended to considerable length, measured in a vertical direction, but they are magnetized crosswise; i. e., their poles are in the inner and outer vertical edges thereof, so that the effect of their being extended vertically as described is to increase their width and thereby permit a limited degree of movement of the magnets 114 with respect to the armature 113 when the casing 16 rotates about the minor axis of the gyro, without reducing the ability of the magnets 114 to retain the armature 113 and the indicator 106 in position extending accurately transversely with respect to the casing 16. As clearly shown in Figures 5 and 7, the dial plate 102 is interposed between the magnets 114 and the armature 113; however, it has no tendency to impair the efficiency of the attraction for the armature inasmuch as it is composed of suitable non-magnetic material, such as brass, permitting the magnetic lines of force to pass therethrough unhampered. It is apparent therefore that the indicator 106 is so mounted that it is retained at all times extending accurately transversely with respect to the casing 16 so that even though the rotor housing 44 upon which it is mounted remains horizontal when the airplane banks, causing, of course, the casing 16 to tilt about a longitudinal axis, the indicator 106 is caused to rotate similarly about the major axis of the gyro, since it is mediately connected to the casing 16 through the expedient of the magnets 114.

In order to facilitate interpretation of the instrument's reading by the pilot, I prefer to provide a pointer 117, rigid with the rod 112 and extending upwards therefrom through an arcuate slot in the dial plate 102, so as to make its point 118 visible therebefore, where it is disposed in cooperative relationship with a series of indicia 119, so calibrated as to indicate when observed in connection with the position of the point 118, the number of degrees of roll or bank.

Figure 2:
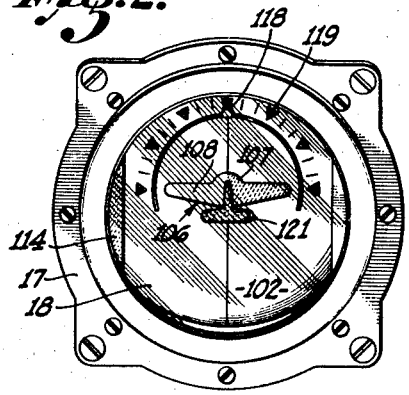
Figure 2 is a view similar to Figure 1, drawn to slightly reduced scale, with the indicating media showing climb, or "tail low" attitude.
Figure 3:
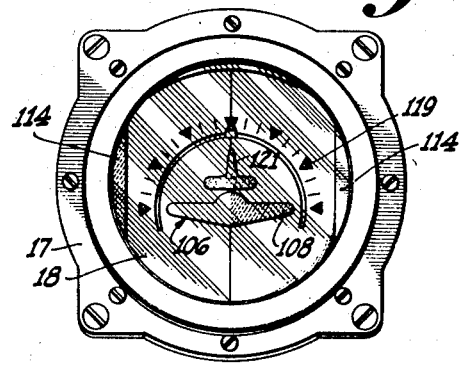
Figure 3 is a view similar to Figure 2, with the indicating media showing dive, or "tail high" attitude.
Figure 4:
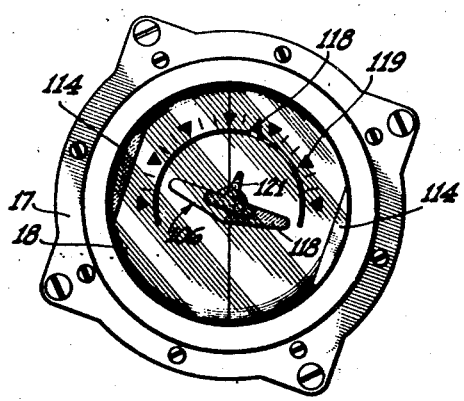
Figure 4 is another view similar to Figure 2 with the indicating media showing that the airplane upon which the instrument is mounted is experiencing a banking maneuver to the right.

The indicator 106 in addition to its use as a portion of the roll or bank indicator, also serves to show climb or "tail low" attitude of the airplane on which it is installed, and dive or "tail high" attitude. The gyro, of course, remains in substantially fixed attitude regardless of the pitching of the ship by which it is carried, and accordingly, when any pitching movement of the ship occurs, the casing 16 which is rigid with the instrument panel thereof, will rotate about the transverse or minor axis of the gyroscope. Say, for example, that the ship goes into diving or "tail high" attitude. This will cause the casing 16 to rotate with respect to the gyro, and about the axes of the pins 46, in a clockwise direction as viewed upon Figure 7. As the result, the front of the casing will rise with respect to the indicator 106, bringing the parts substantially to the position illustrated in Figure 3, wherein the indicator 106 appears at a lower position with respect to the opening through which the device is observed. To provide a basis of comparison to facilitate interpreting apparent up and down movements of the indicator 106 which follow from the actual movements of the casing 16, I provide an auxiliary indicator 121 which is affixed to the window 18 as by being bonded to the inner surface thereof, with result that it is fixed with respect to the casing 16 and the glass 18. This indicator 121 is of such form that it simulates the tail structure of an airplane. Accordingly, it co-operates with the indicator 106 to the extent that the two, when viewed simultaneously, closely simulate the appearance of an airplane when viewed from the rear, with the result that their combined effect is much the same as though a motion picture were being taken of the ship that is being flown, from a position astern thereof, and image thus photographed projected upon the instrument panel. Accordingly, when the ship that is being flown noses down, causing the casing 16 to tilt forward, i. e., rotate clockwise as viewed on Figure 7, the auxiliary indicator 121 will rise with respect to the larger indicator 106, causing the indicating media of the instrument to assume positions similar to those indicated in Figure 3. Conversely, when the ship being flown noses up as during a climbing maneuver, the auxiliary indicator 121 will drop with respect to the indicator 108 as illustrated in Figure 2.

It is believed apparent from the hereinabove description of the structure and operation of my improved navigating instrument that by its observation the pilot will be informed immediately and accurately as to the attitude of his ship without having to interpret the movements of a line or any other indicator which simulates the unreal movements of the real horizon line, which of course is stationary at all times, but which presents to the pilot the artificial appearance of moving whenever his ship changes its attitude with respect to the horizontal. Instead of depicting actions which actually do not occur, but only appear to occur, as a result of some other actions regarding which the pilot should be kept informed, the present instrument operates upon the principle actually depicting the ship being flown and showing the movements which it undergoes, so that the effect upon the pilot's consciousness is identical with that which he would gain were he able to observe his own ship from a point astern of it where any banking or other deviation of the ship from level flight would instantly be obvious to the pilot without the necessity of any interpretation whatsoever.

I claim:

1. An instrument for indicating attitude of an aircraft comprising a casing, an indicator fixed with respect to said casing and simulating an after portion of an airplane, a second indicator simulating a forward portion of an airplane and mounted adjacent said fixed indicator for up and down movement with respect thereto, stabilizing means, means connecting said second indicator to said stabilizing means to retain it in substantially fixed position as said instrument pitches, a third indicator mounted for tilting movement with respect to said other two indicators, and means connecting said third indicator to said stabilizing means to be retained in predetermined relationship to the horizontal as said instrument rolls.

2. In an instrument for indicating spacial orientation, a casing, a gyroscope therein, a gimbal supporting said gyroscope for free rotary motion about mutually perpendicular horizontal axes, said axes respectively extending longitudinally and transversely of said casing, an indicator carried by said gyroscope in position offset longitudinally from said transverse axis whereby said indicator is displaced vertically with respect to said casing when said casing pitches, a second indicator affixed to said casing for conjoint indication with said first indicator, said second indicator being movable thereby with respect to said gyro-borne indicator to indicate pitching of said casing, said gyro-borne indicator being journaled on said gyroscope for tilting movement about a longitudinal axis, and means connecting said gyro-borne indicator to said casing to be tilted therewith about said longitudinal axis of said indicator, said connecting means comprising a magnet carried by said casing and disposed adjacent and parallel to the path of said gyro-borne indicator's vertical displacement and an armature carried by said gyro-borne indicator.

3. In a gyroscopic instrument, a casing, a gimbal for supporting a gyroscope therein, a bracket rigid with said gimbal, a bracket rigid with said casing, a pair of axially aligned bearings interconnecting said brackets for free rotary movement with respect to each other, both of said bearings being on the same side of said gyroscope to support the gyroscope and yet leave the opposite side thereof unrestricted, each of said bearings comprising a substantially pointed pin carried by one of said brackets and anti-friction means in revoluble engagement with the pointed portion thereof and carried by the other of said brackets, means for conducting fluid to said gyroscope comprising interfitting and relatively revoluble male and female joint sections carried respectively by said brackets in axial alignment with said bearings, packing means interposed between said joint sections to resist leakage of fluid therebetween, and means providing a conduit on each of said brackets communicating with the associated section of said joint.

4. In a gyroscopic instrument, a casing, a gimbal for supporting a gyroscope therein, a bracket rigid with said gimbal, a bracket rigid with said casing, a pair of axially aligned bearings interconnecting said brackets for free rotary movement with respect to each other, both of said bearings being on the same side of said gyroscope to support the gyroscope and yet leave the opposite side thereof unrestricted, means for conducting fluid to said gyroscope comprising interfitting and relatively revoluble male and female joint sections carried respectively by said brackets in axial alignment with said bearings, packing means interposed between said joint sections to resist leakage of fluid therebetween, and means providing a conduit on each of said brackets communicating with the associated section of said joint.

5. An instrument for indicating variation in the attitude of a craft with respect to a horizontal plane, comprising a pair of indicators which, when viewed simultaneously, jointly simulate the appearance of said craft, each of said indicators simulating the appearance of a different part of said craft, means individually mounting said indicators for vertical movement with respect to each other, and means operative in response to rotary movement of said craft about a horizontal axis for producing relative vertical movement between said indicators and thereby simulating the actual tipping movement of said craft responsible for said relative movement of said indicators.

THOMAS O. SUMMERS, Jr.

REFERENCES CITED

The following references are of record in the file of this patent:

UNITED STATES PATENTS

| Number | Name | Date |
|---|---|---|
| 1,939,825 | Narvesen et al. | Dec. 19, 1933 |
| 2,183,133 | Carter | Dec. 12, 1939 |
| 2,044,151 | Sperry et al. | June 16, 1936 |
| 1,988,591 | Gillmor | Jan. 22, 1935 |
| 2,232,537 | Kollsman | Feb. 18, 1941 |
| 2,170,087 | McPherson | Aug. 22, 1939 |

FOREIGN PATENTS

| Number | Country | Date |
|---|---|---|
| 425,111 | Great Britain | Mar. 4, 1935 |